(12) United States Patent
Meshkin et al.

(10) Patent No.: US 12,159,383 B2
(45) Date of Patent: Dec. 3, 2024

(54) INTEGRATED MACHINE LEARNING ALGORITHMS FOR IMAGE FILTERS

(71) Applicant: Meta Platforms, Inc., Menlo Park, CA (US)

(72) Inventors: Houman Meshkin, Orinda, CA (US); Jeong-Mo Hong, Santa Monica, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 307 days.

(21) Appl. No.: 17/521,355

(22) Filed: Nov. 8, 2021

(65) Prior Publication Data

US 2023/0146181 A1   May 11, 2023

(51) Int. Cl.
| | |
|---|---|
| *G06K 9/38* | (2006.01) |
| *G06F 18/214* | (2023.01) |
| *G06N 3/04* | (2023.01) |
| *G06T 5/92* | (2024.01) |
| *G06V 20/40* | (2022.01) |

(52) U.S. Cl.
CPC ............... *G06T 5/92* (2024.01); *G06F 18/214* (2023.01); *G06N 3/04* (2013.01); *G06V 20/41* (2022.01)

(58) Field of Classification Search
CPC ......... G06T 5/92; G06T 5/90; G06T 2200/28; G06T 2207/10016; G06T 2207/10024; G06T 2207/10144; G06T 2207/20016; G06T 2207/20081; G06T 2207/20084; G06T 2207/20208; G06F 18/214; G06N 3/04; G06V 20/41
See application file for complete search history.

(56) References Cited

PUBLICATIONS

Feifan Lv, Attention Guided Low-Light Image Enhancement with a Large Scale Low-Light Simulation Dataset, May 7, 2021, International Journal of Computer Vision (2021) 129: 2175-2193.*
Michaël Gharbi, Deep Bilateral Learning for Real-Time Image Enhancement, Aug. 22, 2017, arXiv:1707.02880v2 [cs.GR].*
Yu-sheng Chen, Deep Photo Enhancer: Unpaired Learning for Image Enhancement from Photographs with GANs, , 2018 IEEE.*
Chen Y-S., et al., "Deep Photo Enhancer. Unpaired Learning for Image Enhancement from Photographs with GANs," IEEE/CVF Conference on Computer Vision and Pattern Recognition, Jun. 18, 2018, pp. 6306-6314.

(Continued)

*Primary Examiner* — Xin Jia
(74) *Attorney, Agent, or Firm* — McDermott Will & Emery LLP

(57) ABSTRACT

Various aspects of the subject technology relate to systems, methods, and machine-readable media for outputting filtered visual media content items. Various aspects may include receiving an input frame of a visual media content item. Aspects may also include training a machine learning algorithm based on a dataset of bracketed images. Aspects may include configuring a neural network based on image filtering of the input frame and via a shader component of a graphics processing unit. Aspects may include determining portions of the input frame that are associated with an extent of darkness. Aspects may include performing an image enhancement operation to the portions of the input frame. Aspects may include providing instructions to display an output frame changed by the image enhancement operation.

18 Claims, 9 Drawing Sheets

(56) References Cited

PUBLICATIONS

Gharbi M., et al., "Deep Bilateral Learning for Real-Time Image Enhancement," Association for Computing Machinery Transactions on Graphics (TOG), Jul. 2017, vol. 36, No. 4, pp. 118:1-118:12.
EPO—International Search Report and Written Opinion for International Application No. PCT/US2022/049020, mailed Mar. 16, 2023, 10 pages.
Lv F., et al., "Attention Guided Low-Light Image Enhancement with a Large Scale Low-Light Simulation Dataset," International Journal of Computer Vision, May 7, 2021, 19 pages.

\* cited by examiner

INTEGRATED MACHINE LEARNING ALGORITHMS FOR IMAGE FILTERS

TECHNICAL FIELD

The present disclosure generally relates to implementing machine learning algorithms for enhancing images, and more particularly to implementing real time image enhancement via an integrated graphics and machine learning pipeline on a graphics processing unit.

BACKGROUND

Machine learning algorithms for image filtering and/or enhancement may be computing intensive and slow to execute. For example, such algorithms (e.g., for high dynamic range (HDR) applications) intended to run in real-time may require consumption of a large quantity of computer processing and memory resources. Output delay involved in execution of machine learning algorithms may frustrate users of user devices performing image filtering and/or enhancement. A HDR machine learning algorithm requiring less computer processing time may enable real-time or near real-time image processing of images taken on a mobile device (e.g., via smartphone camera), such as image processing to enhance image brightness. For example, a neural network that may be implemented entirely on a graphics processing unit (GPU) of the mobile device may advantageously increase the speed of real-time image processing.

SUMMARY

Various aspects of the subject technology relate to systems, methods, and machine-readable media for outputting filtered visual media content items via an integrated pipeline implemented on a graphics processing unit (GPU). The integrated pipeline may be formed by converging a computer graphics rendering pipeline (e.g., in two and three dimensions) with machine learning. For example, one or more neural networks may be configured on and/or executed by a shader component of the integrated pipeline. As an example, a machine learning algorithm configured on the integrated pipeline may involve execution of a convolutional neural network (CNN) being trained on an unpaired bracketed dataset via a generative adversarial network (GAN).

In particular, the trained neural network of the machine learning algorithm may run in real-time on the GPU of a mobile computing device to perform an image enhancement or filtering operation, such as a global brightening operation to improve contrast throughout output frames/images. The majority of learning and inferencing by the CNN may be performed for low resolution images and reproduced for high resolution images via slicing and learned bilateral upsampling to improve the quality and speed of an image enhancement operation performed in real-time or near real-time. The CNN can be trained quickly offline via a GAN comprising a self-regularized attention mechanism as generator and global-local discriminator based on an unpaired bracketing dataset with relatively few images. For example, the dataset may have 2000 to 4000 images and training time may span 2 to 4 hours. In this way, the trained CNN may run in real-time or near real-time on a mobile device GPU.

The neural network(s) for performing HDR based image enhancement during runtime (e.g., approximate an HDR generated image from one input image) may advantageously involve less output delay. For example, output delay may be reduced from approximately 10 seconds per frame to a range of approximately 100 to 33 milliseconds per frame. This reduction in delay may be realized by implementing the neural network(s) onto an integrated pipeline of a mobile device GPU which converges computer graphics rendering with machine learning. Such an implementation can avoid, minimize, or otherwise reduce transfer of data between a central processing unit (CPU) and the GPU. In this way, the present disclosure advantageously may provide an architecture for improving the speed and/or performance of machine learning algorithms used to output images/frames that have been intelligently brightened to provide more detail in darker/underexposed areas (e.g., to maintain better contrast with globally brightened images).

According to one embodiment of the present disclosure, a computer-implemented method for outputting filtered visual media content items is provided. The method includes receiving an input frame of a visual media content item. The method also includes training a machine learning algorithm based on a dataset of bracketed images. The method also includes configuring, via a shader component of a graphics processing unit, a neural network of the machine learning algorithm based on image filtering of the input frame. The method also includes determining one or more portions of the input frame that are associated with an extent of darkness. The method also includes performing, by the neural network, an image enhancement operation to the one or more portions of the input frame. The method also includes providing instructions to display an output frame having one or more portions changed by the image enhancement operation.

According to one embodiment of the present disclosure, a system is provided including a processor and a memory comprising instructions stored thereon, which when executed by the processor, cause the processor to perform a method for outputting filtered visual media content items. The method includes receiving an input frame of a visual media content item. The method also includes training a machine learning algorithm based on a dataset of bracketed images. The method also includes configuring, via a shader component of a graphics processing unit, a neural network of the machine learning algorithm based on image filtering of the input frame. The method also includes determining one or more portions of the input frame that are associated with an extent of darkness. The method also includes performing, by the neural network, an image enhancement operation to the one or more portions of the input frame. The method also includes providing instructions to display an output frame having one or more portions changed by the image enhancement operation.

According to one embodiment of the present disclosure, a non-transitory computer-readable storage medium is provided including instructions (e.g., stored sequences of instructions) that, when executed by a processor, cause the processor to perform a method for outputting filtered visual media content items. The method includes receiving an input frame of a visual media content item. The method also includes training a machine learning algorithm based on a dataset of bracketed images. The method also includes configuring, via a shader component of a graphics processing unit, a neural network of the machine learning algorithm based on image filtering of the input frame. The method also includes determining one or more portions of the input frame that are associated with an extent of darkness. The method also includes performing, by the neural network, an image enhancement operation to the one or more portions of the input frame. The method also includes providing instructions to display an output frame having one or more portions changed by the image enhancement operation.

According to one embodiment of the present disclosure, a computer-implemented method for outputting filtered visual media content items is provided. The method includes generating, via a camera, a plurality of successive images at a plurality of exposure levels. The method also includes determining a dataset of bracketed images based on the plurality of successive images. The method also includes receiving an input frame of a visual media content item. The method also includes training a neural network of a machine learning algorithm based on a dataset of bracketed images. The method also includes configuring, via a shader component of a graphics processing unit, the neural network of the machine learning algorithm based on image filtering of the input frame. The method also includes determining one or more portions of the input frame that are associated with an extent of darkness. The method also includes determining, by the neutral network, a bilateral grid of affine coefficients. The method also includes performing, by the neural network and based on the bilateral grid of affine coefficients, an image enhancement operation to the one or more portions of the input frame. The method also includes providing instructions to display an output frame having one or more portions changed by the image enhancement operation.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
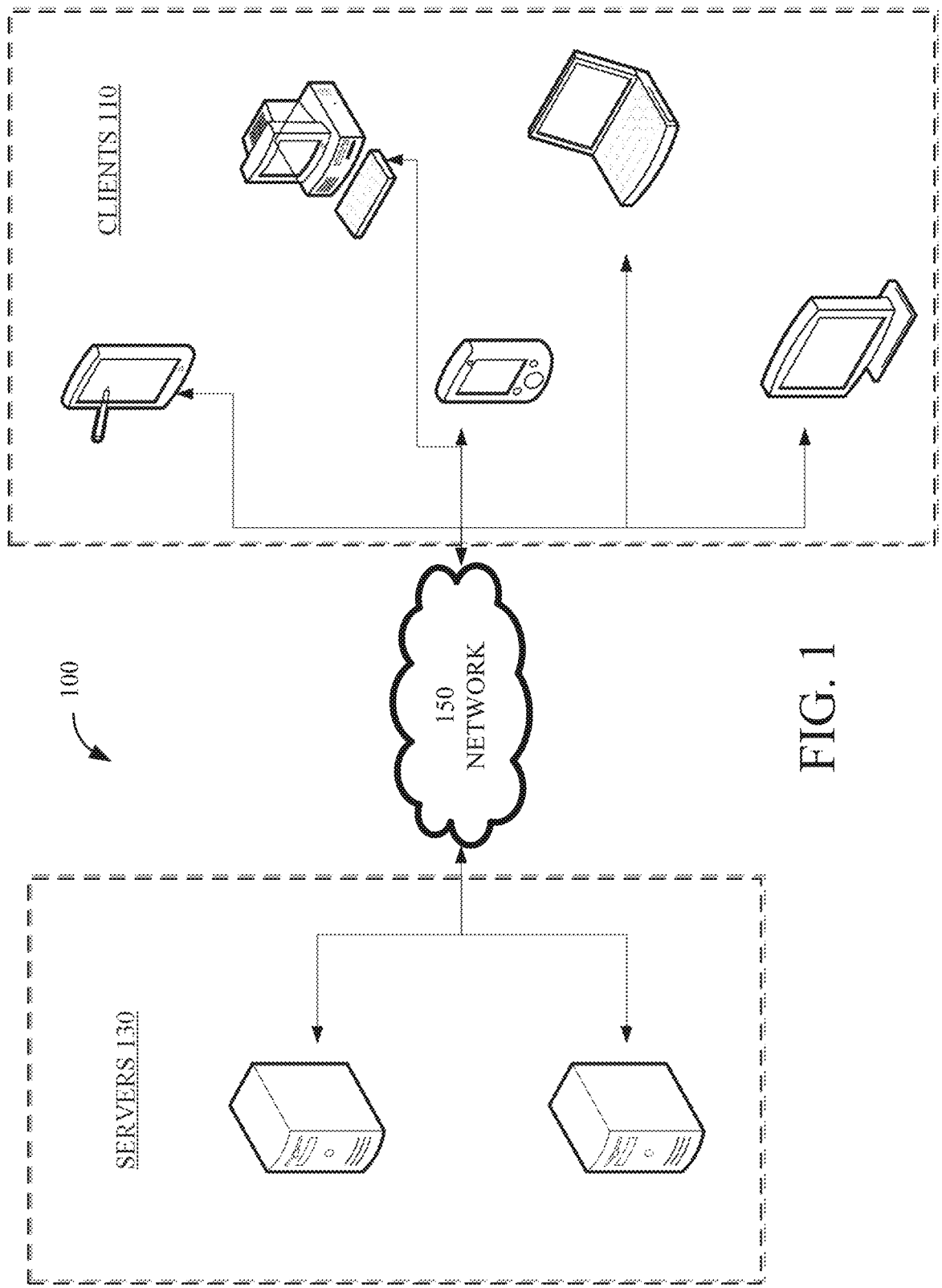
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed systems, methods, and machine-readable media address a problem in traditional computing platforms for executing machine learning algorithms for near-real time image filters, namely on mobile computing devices. One problem associated with such algorithms is that executing such algorithm can be very computing intensive and slow. This is a problem specifically arising in the realm of computer technology. The problem is addressed by providing a solution also rooted in computer technology, namely, by providing reduced output delay, improved machine learning training dataset, reduced training time, increased processing speed, and/or improved image processing for an image enhancement operation. For example, the solution may improve the performance of a neural network that outputs an image that approximates the effect of an HDR image (e.g., HDR+ image operator that combines multiple images such as a burst of underexposed frames to produce a single high-resolution photograph) at a relatively low processing speed.

In this way, the solution may enable implementation of the disclosed machine learning solution entirely on a GPU of a mobile computing device, such as via an integrated pipeline of the GPU. For example, neural network(s) can be implemented on a shader component of the GPU. The image operator operation performed by the GPU neural network(s) may run quickly and/or with less processing cost. As an example, the integrated pipeline of the GPU may perform improved feature extraction in the context of execution of a suitable machine learning algorithm. As an example, the integrated pipeline of the GPU may execute a machine learning HDR algorithm via neural network(s) at a processing speed of 33 millisecond per frame. That is, the machine learning HDR algorithm can be run in real time or near real time on various mobile computing devices in order to output globally brightened images to provide more detail in darker/ underexposed areas and to provide other desired image enhancements to input frame(s), photographs, and/or visual media content items. As used herein, visual media content items can refer to images, photographs, videos, animate images, graphical content items, and/or the like. In this way, the subject technology provides advantages for computer architectures and/or systems for executing machine learning algorithms, such as neural networks for real time or near real time image enhancement and/or image filtering. In particular, the image enhancement and/or image filtering advantageously may be performed more quickly and at lower cost on mobile computing devices.

FIG. 1 is a block diagram of a device operating environment with which aspects of the present disclosure can be implemented. FIG. 1 illustrates an exemplary network architecture 100 to provide a computing platform (e.g., implemented on a GPU of a mobile computing device) for outputting filtered visual media content items, according to some embodiments. Outputting the filtered visual media content items may involve training a neural network (e.g., CNN) with a GAN to generate a HDR enhanced image from one input frame (e.g., generating a similar HDR result to approximate HDR with only one input image rather than combining multiple images into one image via HDR). The input frame may be (or be downsampled to) a low resolution image that is used by the CNN to generate a bilateral grid to transform a high resolution input image, which may save time. The CNN may have one or more characteristics similar to those described in *Deep Bilateral Learning for Real-Time Image Enhancement* by Gharbi et al., published in the ACM Transactions on Graphics, Vol. 36, No. 4, Article 118, July 2017, which is herein incorporated in its entirety by reference. The GAN may have one or more characteristics similar to those described in *EnlightenGAN: Deep Light Enhancement without Paired Supervision* by Jian et al., published in the Journal of Latex Class Files, Vol. 14, No. 8, August 2015, which is herein incorporated in its entirety by reference.

The CNN may be trained faster via an attention-guide U-Net and global-location discriminator of the GAN. As an example, the GAN may train the CNN more quickly and/or in an unsupervised manner, such as via a created data set that is efficiently created from a camera taking pictures with bracketing. For example, the data set may comprise between 2000 to 4000 images of multiple bracketed camera images. That is, the dataset can include unpaired quantities or sets of bracketed images for different scenes. Each set of bracketed images may be generated from the camera capturing multiple images of the same scene with different settings such as various exposure levels. As an example, the camera can take 3, 5, 7, 9, or etc. images of the same scene at a short shutter speed, a medium shutter speed, and a fast shutter speed (e.g., a central shutter speed with another speed greater than the central speed and another speed that is less than the central speed). As an example, the camera can take multiple shots that are incrementally different via steps in exposure range. The CNN can be trained faster based on this unpaired bracketing dataset to generate an output image from an input image that approximates the effect of HDR. The trained CNN may be implemented on an integrated pipeline, such as a GPU integrated pipeline implemented on a mobile computing device GPU (e.g., GPU of a smartphone). Accordingly, the mobile computing device can be a user device, one of the client devices 110, and/or the like.

The user of the mobile computing client device 110 may create, access, and manage visual content items that can be input frames or images used by the CNN for an image filtering or enhancement operation. The GPU of the mobile computing client device 110 can be configured to implement image enhancement and/or filtering operations, which may be machine learning operations or non-machine learning operations. The non-machine learning operations can involve a human based change to the brightness of the image. The GPU of the mobile computing client device 110 may be configured to implement such operations without any data transfer to a central processing unit (CPU) of the client device 110, including image operators of artificial intelligence (AI) filters. In this way, the GPU of the present disclosure may implement image operators (e.g., color correction, auto-exposure, dehazing, tone-mapping, detail enhancement, retouching, brightness modulation, etc.) including AI image operators, on an integrated pipeline without the extra cost of CPU-GPU synchronization.

For example, the integrated pipeline may advantageously avoid the delay of copying data from the CPU (e.g., CPU running PyTorch machine learning library) for pre-processing and filters performed on the GPU. The GPU may be implemented in conjunction with a GPU backend (e.g., PyTorch GPU backend on IGL Vulkan and Metal backend). The integrated pipeline may be referred to as a neural renderer, which may be perform AI filtering operations, such as implementing a neural network for image filtering/enhancement. A suitable image filtering/enhancement operation may be selected on a graphical user interface (GUI) of the mobile computing client device 110 by the user. For example, the GUI may be part of an image sharing or content management application executed on the mobile computing client device. As an example, the user may select an image filtering/enhancement operation for images and videos uploaded to a content platform corresponding to the content management application. The GUI may be hosted or accessed on a network such as the network 150, which may be the Internet. In this way, the GUI may be accessed in an online or offline manner via the network 150 such as via an identifier (e.g., web address, website, uniform resource location (URL)) of a website/webpage on the World Wide Web (WWW) accessible via the Internet. The offline manner may involve accessing a cached, previously saved offline version of the content platform, for example.

The network architecture of FIG. 1 includes one or more client devices 110 and one or more servers 130 which are communicatively coupled through the network 150. The network 150 may include a wired network (e.g., via fiber optic or copper wire, telephone lines, and the like) or wireless network (e.g., a cellular network, radio-frequency (RF) network, Wi-Fi, Bluetooth, and the like). The client devices 110 may be any one of a mobile device, a laptop, a desktop, a tablet (e.g., palm or pad) device, a television, a display device, and/or the like. The client devices 110 can be controlled by a user to manage, request, execute, and/or otherwise manage enhancement and filtering operations on visual content items uploaded onto or hosted by the content platform, such as via the mechanisms described herein. Multiple client devices 110 may have access to the content platform hosted by the servers 130 via an online or offline connection, such as a wireless connection, wired connection, ad hoc connection, mobile connection, satellite connection, and/or the like. Each of the servers 130 may be a computing device such as part of a cloud computing server including one or more desktop computers or panels mounted on racks, and/or the like. The panels may include processing boards and also switchboards, routers, and other network devices.

The servers 130 may comprise memory to determine, host, manage, analyze, filter/enhance, and/or display uploaded visual content items via the content platform. The computing devices of the servers 130 can comprise processors to execute various algorithms and/or modules for executing machine learning algorithms for real time or near real time image filtering via the content platform. For example, data storage components of the servers 130 may store a machine learning training dataset to train a neural network to perform the image filtering at run time on each of the client devices 110. For example, the computing devices of the servers 130 may implement a GAN having a self-regularizing generator and global local discriminator to train the neural network implemented on a shader component of the GPUs of each of the client devices 110. Although training of the neural network is described as being performed separately by the servers 130, the training and execution of the neural network could be performed by the same computing component, such as all being performed on each of the client devices 110 or having the servers 130 and client devices 110 being part of the same computing system.

Figure 2:
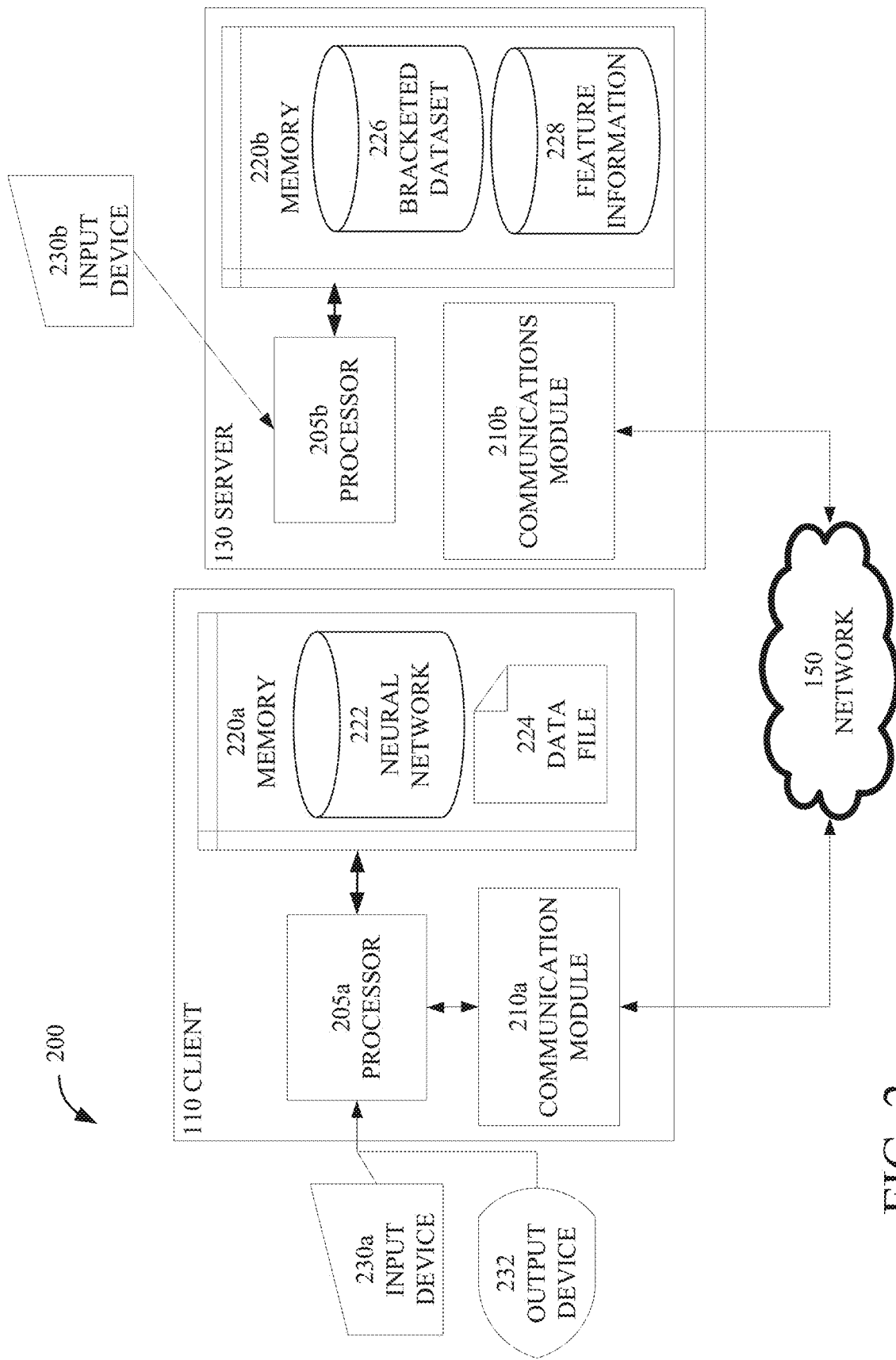
FIG. 2 is a block diagram of an example computing network of an example content platform for outputting filtered visual media content items, according to certain aspects of the present disclosure.

FIG. 2 is a block diagram of an example computing network 200 of an example content platform for outputting filtered visual media content items, according to certain aspects of the present disclosure. The filtered visual media content items may be converted from generally darker images to generally brighter images. FIG. 2 illustrates a client device (of one or more client devices) 110 and a server (of one or more servers) 130 of the example computing network 200 for use in the network architecture of FIG. 1, according to some embodiments. Each of the one or more client devices 110 and the one or more servers 130 may access each other and other devices in the network 150 via corresponding communications modules 210a-210b. The communications modules 210a-210b may each include radio hardware and software such as RF antennas, analog circuitry, digital to analog conversion circuits, digital signal processing circuitry, and/or the like. The client device 110 and server 130 depicted in FIGS. 1-2 may each include a processor 205a-205b and memory 110a-110b, respectively.

Generally, the client device 110 and the server 130 comprise computing devices including at least: the memory 220a-220b storing instructions and processors 205a-205b configured to execute the instructions to perform, at least partially, one or more steps as described in methods disclosed herein. For example, the memory 220a of the client device 110 may be used to gain access to a browser, application, or device component corresponding to the content platform hosted by the server 130. The client device 110 may be used by a user of the content platform, such as to access, filter, or enhance visual content items uploaded or managed on the content platform, such as via a graphical user interface (GUI) screen rendered on the client device 110. For example, the client device 110 may be coupled to at least one input device 230a and output device 232 accessible by the user (e.g., for user input and output perceivable by the user). The input device 230a can include a mouse, keyboard, a pointer, a stylus, a touchscreen display, microphone, voice recognition software, graphical user interface (GUI), and/or the like. The output device 232 can include a display (e.g., the same touchscreen display as the input device), a speaker, an alarm, and the like.

As an example, the user may control and manage visual content items via the input device 230a, such as uploading pictures, videos, animations, and/or the like for sharing or other user desired operations on the content platform. That is, the user can use mechanisms for uploading such content items onto the content platform for purposes such as sharing data, creating data, deleting data, searching/filtering for data, and/or the like. The client device 110 or the server 130 may execute algorithms for processing the content items, such as image filtering, global image brightening, image enhancement and/or the like. The image processing can include non-machine learning machine pre-processing and machine learning algorithm based processing. For example, the machine learning algorithm can involve neural network(s) such as CNNs and GANs. As an example, a GAN may use a generator neural network and a discriminator neural network on an unpaired bracketed training dataset for unsupervised training of a CNN. The input device 230a may be used by a user to select one or more visual content items for image processing by the trained CNN. The trained CNN can output, via the output device 232, a frame that approximates the effect of HDR on a single input frame of the selected visual content item.

The processor 205a of the client device 110 may be used to operate the client device 110, such as to execute applications and functions thereof rendered on the client device 110. The applications can include an application corresponding to the content platform. In this way, the user can use the input device 230a (e.g., to send user inputs) to cause the processor 205a to execute machine executable instructions for uploading visual content items on the content platform, as well as select, share, filter, and/or perform other functions associated with refining the uploaded visual content. The processor 205a may comprise a GPU that implements an integrated pipeline for executing a neural network for refining the uploaded visual content, such as based on a copied input image from a graphics pipeline of the client device 110. Images taken by a camera of the client device 110 may be stored in a memory associated with the GPU (e.g., dedicated GPU memory). The GPU integrated pipeline may implement the neural network for image enhancement/filtering on a shader component without using a CPU pipeline of the client device 110. That is, the client device 110 may not need the CPU to function as a PyTorch machine learning back end or to perform inferencing for execution of the neural network/machine learning.

The data file 224 stored in the memory 220a can include application settings, files, and data specific to the associated user of the client device 110, such as saved content, search history, content settings and/or the like corresponding to the associated user's account on the content platform. The data files 224 can contain data indicative of user specific activity, such as organization of visual content items and manual processing or filtering of the specific visual content (e.g., manual retouching of images, manual selection of image filters or image enhancement operators). The data file can also comprise data for a data look up on a bilateral grid (e.g., affine color transformation coefficients) for reconstructing a high resolution image from the bilateral grid via a transformed low resolution input image. Thus, the data file can be used for low resolution learning and inferencing by the neural network. The neural network may operate based on storing one or more neural network models in the database 222. For example, the layers, objects and other components of the neural network may be stored in the database 222. Moreover, training data could be stored in the database 222 although FIG. 2 shows that the training data is stored in database 226.

Advantageously, the server 130 may use unpaired and unsupervised training to train the neural network implemented on the GPU integrated pipeline of the client device 110 at a relatively fast pace and high performance level. As an example, the server 130 may use a GAN framework with an attention mechanism, such as a self regularized attentional map in each level of deep features of the feature information stored in the database 228. The attention mechanism can ensure that low light (e.g., darker) training images or frames are regularized so that the trained neural network learns which areas of an input frame should be enhanced more and which areas should be enhanced less. The features maps of the GAN framework may be stored in the database 228. The bracketed dataset used as training data may be stored in the database 226. As discussed herein, the bracketed dataset can comprise bracketed photos, such as via a single-lens reflex camera, mirror camera, or other camera which may be part of or constitute the client device 110). The bracketed photos may be a sequence of photos (e.g., burst shots) at different camera settings. For example, the client device 110 can be configured to implement auto exposure bracketing such that a press of a shutter release obtains multiple exposures of the same scene. Bracketed photos can comprise a variable quantity of photos of the same scene taken at adjusted exposure compensation, shutter speed, camera settings, and/or the like.

The designer of the neural network training framework can select how many bracketed shots are taken and how much the settings (e.g., exposure) varies before different photo instances of the bracketed photos. The bracketed dataset contained in database 226 can contain between 2000 to 4000 photos, or some other suitable amount of bracketing data. Moreover, the bracketed dataset contained in database 226 can be unpaired (e.g., a dark photo of a scene does not need to be paired with a light photo of the same scene). Because the GAN framework can be used to train the neural network in an unsupervised manner with unpaired data, the training of the neural network can be faster and require less processing resources. The precision of the output of the neural network can be improved by GAN components used during training, such as the attention mechanism and a global-local discriminator to avoid over or under exposure areas of enhanced image outputs generated by the neural network. The database 226 can include "real" (e.g., non manipulated) bracketed pictures as well as "fake" (e.g., computationally image enhanced) pictures for the purposes of training the neural network to output a higher quality image enhanced image, such as an output image that approximates an HDR treatment of an input image.

Although the above description describes certain functions being performed by the processor 205*a* of the client device 110 and other certain functions being performed by the processor 205*b* of the server 130, all of the functions described herein can be performed by the client device 110 and/or the server 130 in some other alternative division of labor. That is, the processors 205*a*, 205*b* could perform more or less of the functions (e.g., portions of the machine learning algorithm and/or image processing) described above. In some embodiments, some or part of the client device 110 can be co-located with the server 130. That is, the server 130 can be remote from or both the client device 110 and the server 130 can be part of the same larger computing system, network, or architecture.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
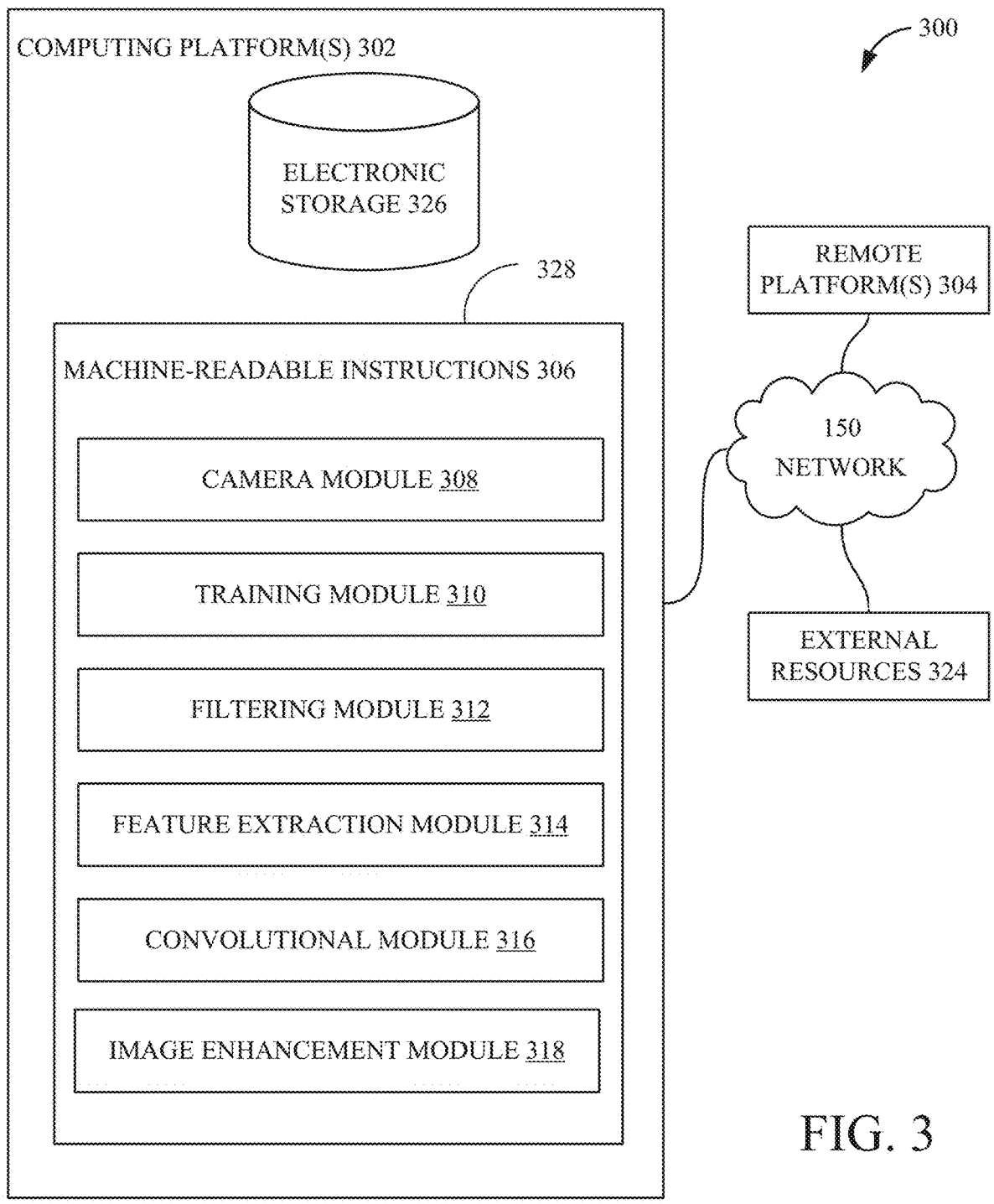
FIG. 3 is a block diagram illustrating an example computer system (e.g., representing both client and server) with which aspects of the subject technology can be implemented.

FIG. 3 is a block diagram illustrating an example computer system 300 (e.g., representing both client and server, one computing device, etc.) with which aspects of the subject technology can be implemented. The system 300 may be configured for outputting image enhanced output images corresponding to a single input image via a cluster platform, according to certain aspects of the disclosure. In some implementations, system 300 may include one or more computing platforms 302. The computing platform(s) 302 can correspond to a client component of a content computing platform, which can be similar to or the same as the client(s) 110 of FIGS. 1-2. As an example, the computing platform(s) 302 can comprise processor(s) 328 that may be similar or the same as processor 205*a*-205*b* and comprise electronic storage 326 that may include data file 224 and/or databases such as databases 222, 226, 228. The computing platform(s) 302 may function as an integrated pipeline implemented on a GPU such as on a shader component of the GPU. The integrated pipeline may be capable of running any machine learning based technique based on running a general neural network on the shader component. The integrated GPU pipeline of the computing platform(s) 302 can be used to initialize and execute a trained neural network or other machine learning algorithm for learned image enhancement.

The computing platform(s) 302 may be configured to communicate with one or more remote platforms 304 according to a client/server architecture, a peer-to-peer architecture, and/or other architectures via a network 150, such as for obtaining training data in an offline training process (e.g., not during runtime) using a bracketed dataset such as described herein. The remote platform(s) 304 may be configured to communicate with other remote platforms via computing platform(s) 302 and/or according to a client/server architecture, a peer-to-peer architecture, and/or other architectures. A designer of a machine learning image filtering and/or enhancement algorithm (e.g., for near-real time image filtering on smartphones) may use the remote platform(s) 304 to train a neural network (e.g., CNN) for applying various desirable image operators for image enhancement. The training time may span two to four hours. The network 150 based training process may involve the remote platform(s) 304 and the training module 310 so that the trained CNN is capable of automatically outputting a globally brightened image with better contrast based on an input image. That is, the CNN may receive a single input frame and output an image enhanced and/or filtered output image that well approximates the effect of applying HDR (e.g., combining multiple images at different capture parameters to output a good image).

The computing platform(s) 302 may be configured by machine-readable instructions 306. The machine-readable instructions 306 may include one or more instruction modules. The instruction modules may include computer program modules. The instruction modules may include one or more of camera module 308, training module 310, filtering module 312, feature extraction module 314, convolutional module 316, image enhancement module 318, and/or the like.

The camera module 308 may be configured to control a camera of the computing platform(s) 302, such as a smartphone camera, a stand-alone camera, a recorder, a suitable reflective lens, and/or the like. The camera module 308 can be configured to capture images and/or videos, such as to select constituent frames as an input frame to a near real-time machine learning image filtering/enhancement algorithm. Additionally or alternatively, the camera module 308 can be capable of taking bracketed photos, such as images or parts of videos, movies, etc., which can be used as part of a bracketed dataset. For example, the bracketed dataset may include multiple images of a single scene taken at different camera settings (e.g., shutter speeds, exposure levels, etc.). That is, one series of bracketed images can include an overly bright image, a generally correctly lighted image, and an overly dark image of the single scene. The series of images can be a suitable quantity of images, such as 3, 5, 7 or some other suitable number.

The bracketed dataset can include multiples series or sets of bracketed images in which each series or set corresponds to a particular single scene. The camera module 308 may be used to generate this training dataset of bracketed images for training the machine learning algorithm in conjunction with the training module 310. For example, the camera module 308 may capture, 3, 5, 7, 9 or some other quantity of images at various exposures based on a user pressing a capture button of a camera associated with camera module 308. Advantageously, the camera module 308 does not need to be configured to capture photos for a paired data set. That is, because the trained CNN can be trained in an unsupervised manner, the challenge associated with obtaining a paired data set for training can be avoided. The camera module 308 may be used to capture arbitrary dark, light, hybrid etc. photos based on taking series of bracketed photos, but the photos do not need to be paired dark and light photos that capture the same scene with bright exposure and dark exposure.

The training module 310 can be configured to train the machine learning algorithm, such as by training a neural network of the machine learning algorithm to approximate various image operators, such as algorithmic image operators (e.g., HDR algorithmic processing), manual image operators (e.g., human-annotated retouches), and/or the like. The training module 310 may train the small neural network of the machine learning algorithm for an AI HDR application, such as based on the training dataset from the camera module 308. The training dataset may be received via the remote platform(s) 304, which can function as a server (e.g., similar to server 130) to train the neural network offline. Accordingly, the training functionality of the training module 310 can be performed offline by the server so that a trained neural network can be initialized by the training module 310 on a user device (e.g., mobile computing device) of the computing platform(s) 302. The training module 310 can train the small neural network to generate, from only one input frame, a resulting output frame that is similar to the output of an HDR algorithm. This way, the trained neural network can approximate the output of the HDR algorithm (which merges multiple captured images at multiple camera setting such as different exposure levels into one image) from only one captured image. As an example, the training module 310 can use a GAN comprising two sub-models that are trained together in a zero-sum game to train the small neural network.

The two sub-models can comprise an attention guided U-net as a generator and a dual discriminator (e.g., global-local discriminator structure) as image discriminator. The U-net generator can be configured to extract features from different depth layers in conjunction with the feature extraction module 314 to synthesize images using context information (e.g., semantic segmentation, image restoration, image enhancement). The U-net generator also may have a self-regularized attention mechanism in each level of deep features to regularize unsupervised learning of the unpaired training dataset of bracketed images, which may prevent or reduce color distortion or inconsistency during image filtering/enhancement. The self-regularized attention mechanism (e.g., via a self-regularized perceptual loss) can be used to constrain a feature distance between an input image and its image enhanced version. In other words, the attention mechanism can be configured to facilitate preservation of image content feature in an input frame before and after it is enhanced by the trained neural network. Moreover, the attention mechanism may be used to support faster training with relative fewer images in a training dataset. The training performed by the training module 310 may be faster because the bracketed training dataset does not have to be paired, such that the bracketed images from the camera module 308 can respectively be arbitrary dark images and light images that do not have to be organized into input/output pairs for supervised learning. Rather, the GAN can cause the trained neural network to learn faster in an unsupervised manner based on the unpaired bracketed training dataset.

The global-local discriminator can be configured to balance global and local low light image enhancement performed by the trained neural network. In particular, the global-local discriminator can handle spatially-varying light conditions in the input frame to reduce or prevent local overexposures or underexposures. The global-local discriminator of the GAN can be used to teach the small neural network to distinguish real images from fake images (image enhanced output images) based on randomly cropped local patches from real images and output images. In this way, the global-local discriminator may train the small neural network to learn local adjustments such as adapting to enhance a small bright region in an overall dark background differently than other regions in the background. The training module 310 in conjunction with the bracketed dataset used as training data may advantageously provide a quick and effect training framework for training the small neural network to convert dark images to light images, such as a deep learning based AI HDR method. Training may occur offline, which is distinct from runtime of the neural network.

The filtering module 312 may be configured to perform image pre-processing. For example, the filtering module 312 can execute a naïve algorithm for adjustment of the general brightness of visual content items, such as on a scale of 0 to 100 or some other suitable scale. The scale values may correspond to higher levels indicating that the general brightness of a content item is closer to white. That is, if the brightness value is set at infinite, then all colors in the content item approximate to all white (e.g., the content item would appear as an entirely white background). Accordingly, images set at infinite brightness will lose contrast. Execution of the algorithm by the filtering module 312 can be used to process red, green, and blue channels independently and mathematically derive an overall mathematical representation of brightness of a scene depicted by the content item. In general, the filtering module 312 can execute various image filters as part of the GPU pipeline and/or CPU, which may be separate from the AI HDR machine learning algorithm executed by the trained neural network. For example, the image filters may be used as part of a pre-processing or post-processing of input frames prior to deep learning image processing applied by the trained neural network. The image filtering applied by the filtering module 312 can be non-machine learning enhancements used to improve the image quality of the input frames. The image filtering applied by the filtering module 312 can be a combination of multiple or a single image filter applied before or after the machine learning algorithm applied by the trained neural network, such as image filters for warmth, saturation, color, and/or the like.

The feature extraction module 314 can be configured to determine feature maps in conjunction with the GAN implemented by the training module 310. For example, the feature maps can be multiplied by attention maps of the self-regularized attention mechanism of the GAN. The feature extraction module 314 may extract a feature distance between images, such as a distance between an output image of the trained neural network and its ground truth. As discussed herein, the attention mechanism can be used for self feature preserving loss to preserve various features after image enhancement performed by the trained neural network. In general, the features extracted by the feature extraction module 314 may be image content features. As an example, during training of the neural network performed by the training module 310, multi-level features from different depth layers can be extracted by the U-net generator in conjunction with the feature extraction module 314.

The feature extraction module 314 can also extract features used for the trained neural network to perform image enhancement of input frames such as tonal adjustments, color corrections, local edits, and/or the like. The features can be low resolution features later transformed to high resolution via bilateral grid upsampling. The feature extraction module 314 can be used by the neural network to learn local features and global features that are fused and used for determination of a bilateral grid of affine coefficients as part of the bilateral grid upsampling process. As an example fusion may result in a 16×16×16 array of features determined via the feature extraction module 314. A slicing operator may be applied to obtain a new upsampled high resolution feature map via tri-linear interpolation, which can be used to transform to a high resolution image via the bilateral grid. A set of full resolution features can be extracted by the feature extraction module 314 to predict a guidance map for color transformations at high resolution and subsequently with the slicing operator for application of affine coefficients to obtain image enhanced full resolution output frames by the trained neural network.

The convolutional module 316 may be configured to implement one or more convolutional layers of the neural network, which can be a CNN. The convolutional layers of the convolution module 316 can include a stack of convolutional layers to process the low resolution features in a local features path, such as to extract semantic information (e.g., recognizing a face in an image) in conjunction with the feature extraction module 314. As an example, the stack of convolutional layers can use progressive downsampling of a high resolution input frame with strided convolutions to perform image enhancement that are reliant on semantic information, such as to recognize the face for correct execution of a face brightening image operator such that the face is brightened while the remainder of the body and background are darkened. The convolutional layers of the convolution module 316 can also include two strided convolutional layers followed by three fully connected layers in a global features path. The convolution module 316 may also include fusion and pointwise layers for fusing the local features and global paths with pointwise affine mixing. In this way, the convolutional module 316 of the CNN can comprise a last output layer represented as a bilateral grid to determine optimal 2D to 3D transition for upsampling via the predicted bilateral grid of affine coefficients. The CNN can also learn non-algorithmic transformation such as manual image adjustments.

The image enhancement module 322 may be configured to output an output image processed by the trained CNN. As an example, the output frame may be processed via machine learned image operators by the trained CNN, such as to approximate the effect of an HDR image filter in real-time or near real-time on a single input image. The image enhancement module 322 can comprise a slicing node for upsampling the bilateral grid of affine coefficients back to a full resolution sliced feature map, such as in conjunction with the feature extraction module 314. That is, the image enhancement module 322 can be configured to assemble the full-resolution output frame. The image enhancement module 322 may perform data-dependent lookups on the bilateral grid based on the guidance map (e.g., to perform local color transforms to each pixel of the input image) to output the image enhanced output image. As used herein, high resolution or full resolution can refer to 320×320 or some other suitable high resolution. As used herein, low resolution can refer to 20×20 or some other suitable low resolution.

The electronic storage 326 may maintain an amount of training data and/or other data necessary for execution of the machine learning algorithm. For example, the electronic storage 326 may store the bracketed dataset, such as a dataset of approximately 2000 to 4000 images. The data and information stored in the electronic storage 326 can be retrievable by the processor(s) 328, such as for execution of the neural network of the machine learning algorithm for a global brightening image enhancement operation or some other suitable image filtering/enhancement operation. Additionally or alternatively, data and information such as image filters and/or the like can be stored in a backend component such as the external resources 324 of a GPU or CPU, for example. For example, the processor(s) 328 can send a request to the external resources 324 to request information from the backend for execution of the machine learning algorithm. As an example, the external resource can include a machine learning library running on a CPU (e.g., PyTorch CPU), a graphics renderer backend, GPU operating system backend, and/or the like. The electronic storage 326 can include data and/or algorithms such as for video anti-aliasing, AI three dimensional look up tables for color filters, noise reduction, model delivery system, video frame interpolation and super-resolution, and/or the like.

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given computing platform 302 (or given remote platform 304) may include one or more processors 328 configured to execute computer program modules. The computer program modules may be configured to enable users associated with the given computing platform 302 to interface with system 300 and/or external resources 324, and/or provide other functionality attributed herein to computing platform(s) 302. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. In some implementations, some or all of the functionality attributed herein to the external resources 324 may be provided by resources included in system 300.

The computing platform(s) 302 may include the electronic storage 326, the processor(s) 328, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

The electronic storage 326 may comprise non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). The electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 326 may include one or more virtual storage resources (e.g., cloud storage, a virtual private network, and/or other virtual storage resources). The electronic storage 326 may store software algorithms, information determined by the processor(s) 328, information received from computing platform(s) 302, information received from the remote platform(s) 304, and/or other information that enables the computing platform(s) 302 to function as described herein.

The processor(s) 328 may be configured to provide information processing capabilities in the computing platform(s) 302. As such, the processor(s) 328 may include one or more of a digital processor, an analog processor, a digital circuit designed to process information, an analog circuit designed to process information, a state machine, and/or other mechanisms for electronically processing information. Although the processor(s) 328 is shown in FIG. 3 as a single entity, this is for illustrative purposes only. In some implementations, the processor(s) 328 may include a plurality of processing units. These processing units may be physically located within the same device, or the processor(s) 328 may represent processing functionality of a plurality of devices operating in coordination. Processor(s) 328 may be configured to execute modules 308, 310, 312, 314, 316, and/or 318 other modules. Processor(s) 328 may be configured to execute modules 308, 310, 312, 314, 316, and/or 318, and/or other modules by software; hardware; firmware; some combination of software, hardware, and/or firmware; and/or other mechanisms for configuring processing capabilities on the processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 308, 310, 312, 314, 316, and/or 318 are illustrated in FIG. 3 as being implemented within a single processing unit, in implementations in which the processor(s) 328 includes multiple processing units, one or more of the modules 308, 310, 312, 314, 316, and/or 318, may be implemented remotely from the other modules. The description of the functionality provided by the different modules 308, 310, 312, 314, 316, and/or 318, described herein is for illustrative purposes, and is not intended to be limiting, as any of the modules 308, 310, 312, 314, 316, and/or 318 may provide more or less functionality than is described. For example, one or more of the modules 308, 310, 312, 314, 316, and/or 318 may be eliminated, and some or all of its functionality may be provided by other ones of the modules 308, 310, 312, 314, 316, and/or 318. As another example, the processor(s) 328 may be configured to execute one or more additional modules that may perform some or all of the functionality attributed below to one of the modules 308, 310, 312, 314, 316, and/or 318.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figures 4A, 4B:
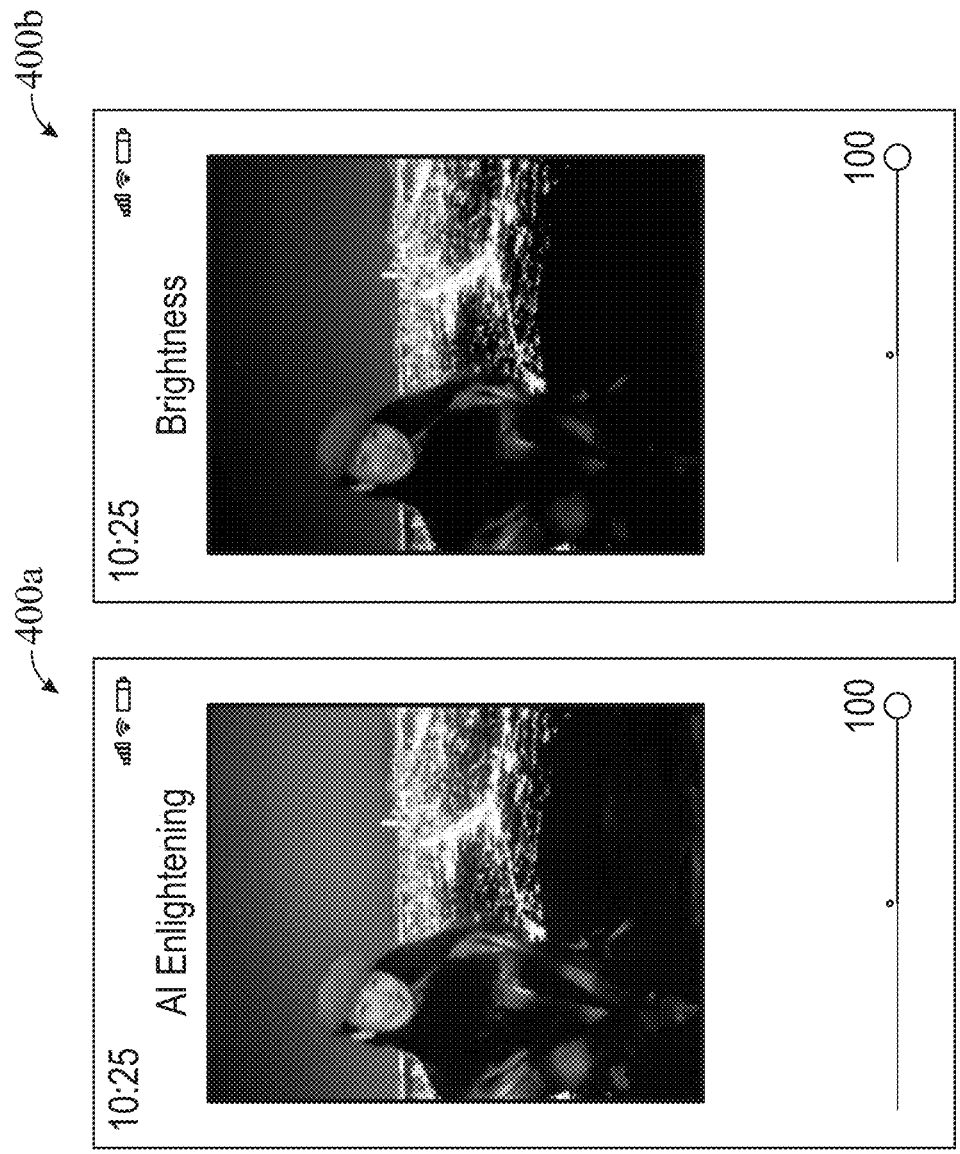
FIGS. 4A-4B are example images respectively filtered for brightness by a machine learning image operator and a manual image operator, according to certain aspects of the present disclosure.

FIGS. 4A-4B are example images 400a, 400b respectively filtered for brightness by a machine learning image operator and a manual image operator, according to certain aspects of the present disclosure. The image 400a can be produced by a trained neural network implemented on a shader component of a GPU pipeline executed by a single mobile computing device. The image 400b can be produced by an image filter executed by the GPU pipeline on the mobile computing device. The image 400a can be a higher quality image filtered/enhanced image that maintains better contrast via an AI machine learning global brightening operation. For example, the face depicted in image 400a can be enhanced by a local brightening operation that represents better contrast against the darker background compared to the image filtered result of image 400b. For example, the AI brightening operation can be an approximation of an HDR image filter performed in real time or near real time by the GPU pipeline on a single input frame selected by a user via the mobile computing device. As an example, the brightness adjusted by the image filter applied on image 400b can be based on a user controlled slider component (e.g., on a graphical user interface) for adjusting general brightness on a scale ranging from 0 to 100. The manual adjustment of global brightness can be a non machine learning based image filter that can be applied as a naïve image filtering operation by the GPU in addition to (e.g., image 400a) or instead of (e.g., image 400b) of a machine learning image filter. The image 400a depicts greater contrast compared to image 400b from the use of the near real time machine learning image filter/enhancement, which may be applied in conjunction with other non-machine learning image filters.

Figure 5:
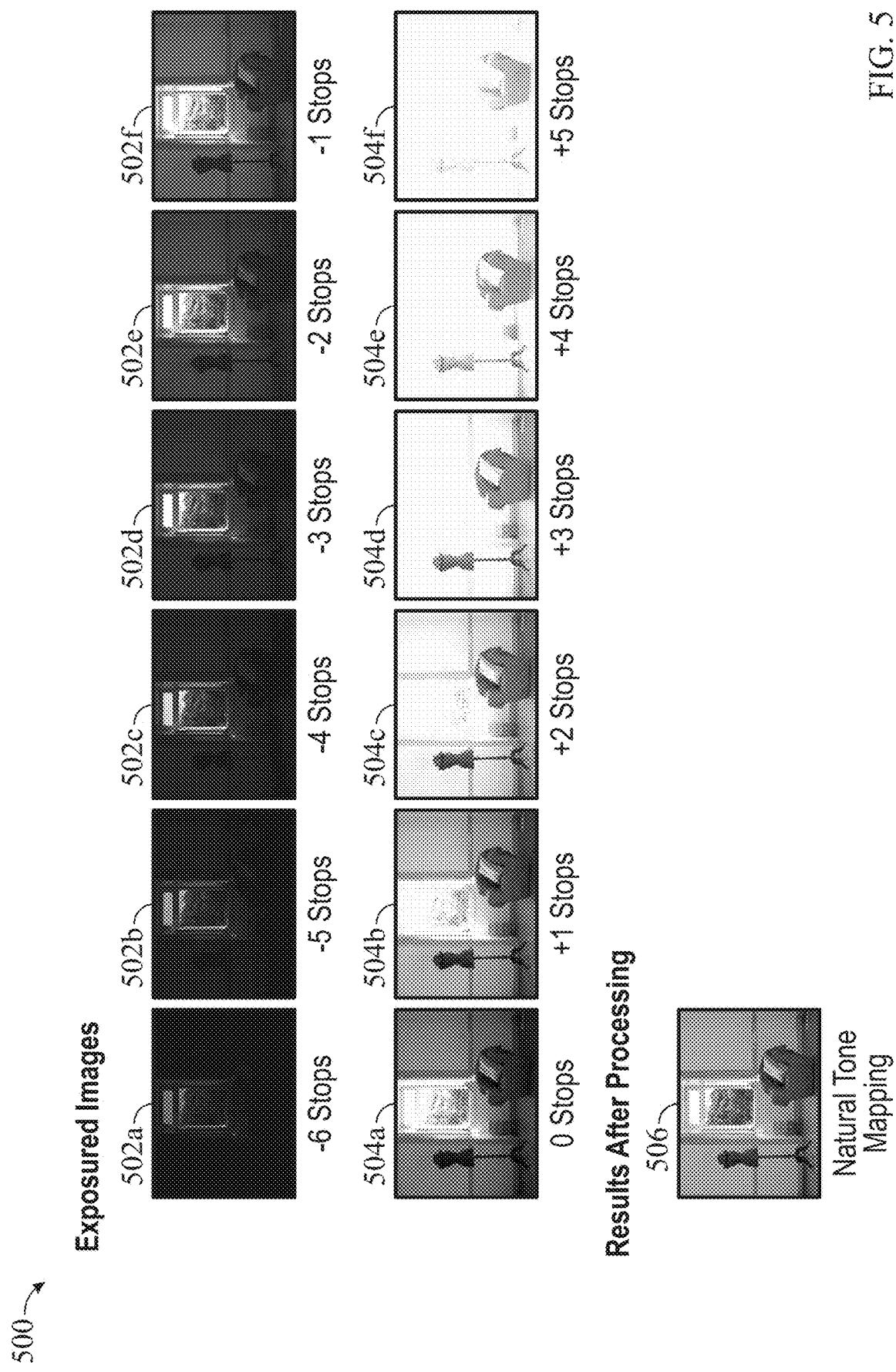
FIG. 5 shows an example application of a high dynamic range imaging technique involving capturing and combining several different exposures of a same scene.

FIG. 5 shows an example application of a high dynamic range imaging technique 500 involving capturing and combining several different exposures of a same scene. As an example, the HDR imaging technique combines multiple images with various capture parameters to generate a globally natural and good image. A trained neural network running a near real time image filter on a mobile device GPU (e.g., integrated pipeline) as described herein can generate an output image from a single input image to approximate the effect of using the HDR imaging technique. The dynamic range of HDR may refer to a ratio between a maximum tonal value and a minimum tonal value. An HDR imaging technique may be used to maintain contrast between scenes such as those involving very bright (e.g., high sunlight) and very dark (e.g., high shade) portions. As such, the trained neural network using machine learning to approximate the HDR imaging technique from only one image input may advantageously be used to maintain better contrast with globally brightened images.

The HDR imaging technique can be a selectable mode on the mobile device, such as an on a smart camera phone. The mobile device can be used to create a composite HDR photo by balancing the shadows and highlights of a scene based on a series of photos taken by the camera of the mobile device, such as a combination of three shots taken within milliseconds of each other and merged into the composite HDR photo. The composite HDR photo may combined multiples exposure or other camera settings via this merging of multiple pictures so that the contrast levels of the composite HDR photo is balanced (e.g., some overexposed components of the photo do not appear washed out and darker areas do not appear only as dark shadows). Alternatively, HDR may involve merging a burst of frames of constant low exposure at the same exposure time. Merging the frames can be based on a pairwise frequency-domain temporal filter, for example. FIG. 5 shows a series of exposure images 502a-502f, 504a-504f. Each of the images 502a-502f, 504a-504f can represent a different stop level, such that the images 502a-502f, 504a-504f represent changes in exposure level.

The changes in exposure level can be changed incrementally by photograph stops measured in terms of exposure value (EV). EV can refer to the location of the current exposure on the camera's exposure index or exposure display the relative distance from one exposure to this mark or another EV level. Shutter speeds or apertures of the camera can also be measured in fractions of EV levels, such as a third of an EV level. As an example, EV levels can span and/or correspond to an integer multiple of a photographic stop. As shown in FIG. 5, the images 502a-502f can span changes in EV levels, each of which can be equivalent of stops of exposure. Accordingly, the images 502a-502f can span from −6 to −1 stops. A negative stop can refer to stopping down, which means a reduction in exposure. As such, as the EV levels transition from −6 stops to −1 stops, the images 502a-502f become incrementally brighter (e.g., go from significantly black to a brighter background).

As shown in FIG. 5, the images 504a-504f can also psan changes in EV levels from 0 stops to 5 stops. A positive stop can refer to stopping up, which means an increase in exposure. As such, as the EV levels transition from 0 stops to 5 stop, the images 502a-502f become incrementally brighter from a generally neural bright at 0 stops to closer to an all-white background at 5 stops. After applying the HDR imaging technique on bursts or series of images captured for merging via HDR, the HDR imaging processing technique can result in the merged image 506 having natural tone mapping. That is, the natural tone mapping can result in boosting shadows, preserving local contrast and sacrificing global contrast in a balanced manner. In this way, the produced merged image 506 from the HDR imaging technique may avoid or reduce underexposed areas (e.g., too dark, can be toned down with HDR and retain details) and overexposed areas (e.g., too bright, can be toned up with HDR to reveal details previously in shadows).

Figure 6:
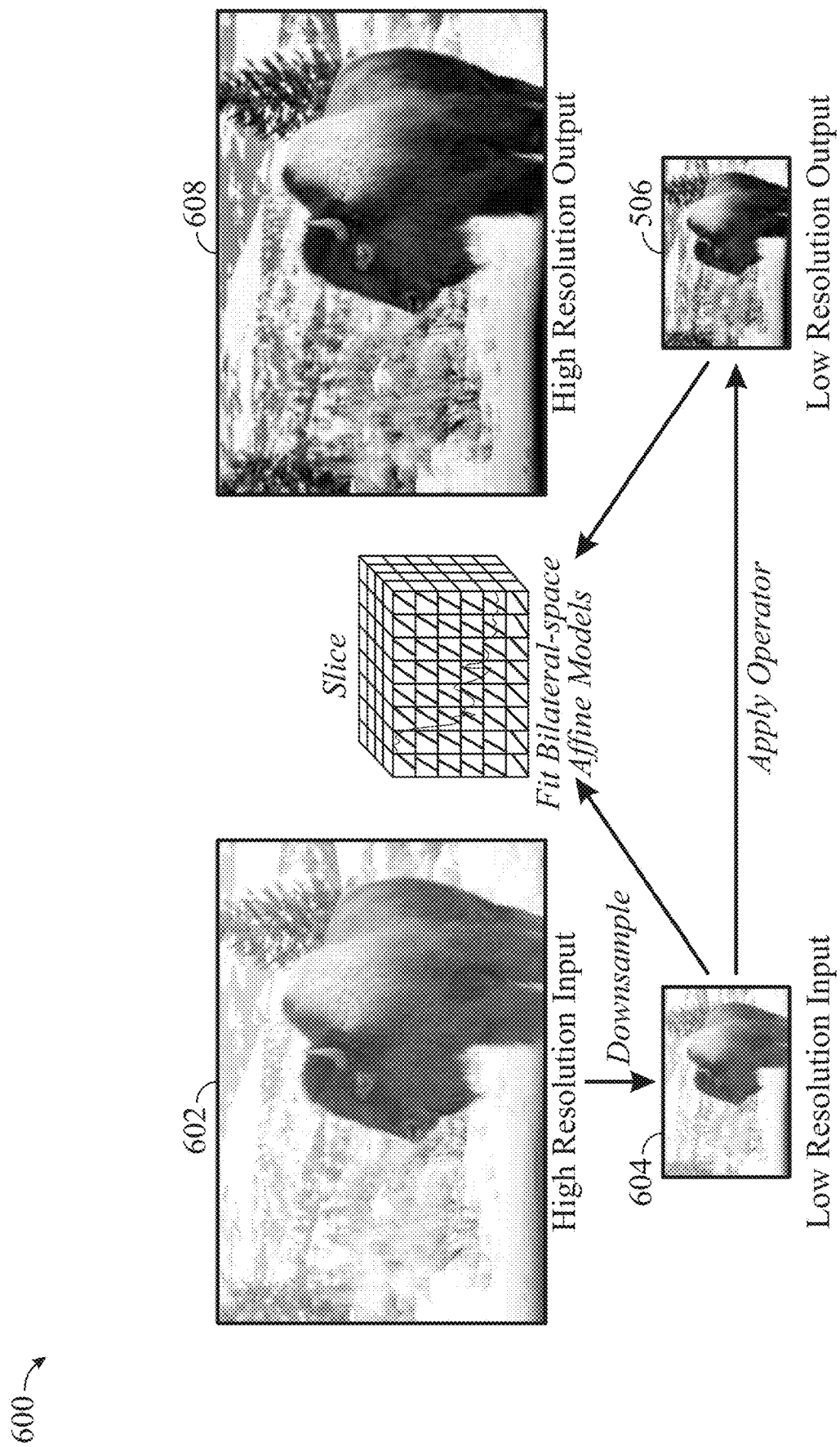
FIG. 6 is an example flow diagram illustrating bilateral guided upsampling, according to certain aspects of the present disclosure.

FIG. 6 is an example flow diagram 600 illustrating bilateral guided upsampling, according to certain aspects of the present disclosure. The bilateral guided upsampling can be used as part of a machine learning algorithm, such as trained neural network applying a near real time filter and/or enhancement to approximate the effect of an HDR imaging technique. As shown in the flow diagram 600, an input frame 602 of a high resolution image can be input to the trained neural network. As discussed herein, the trained neural network advantageously may be relatively small (e.g., in terms of computation processing cost) and can be executed at run time quickly on an integrated GPU pipeline of a mobile computing device. The high resolution input frame can be downsampled to facilitate processing by the trained neural network.

In particular, the trained neural network may learn features in a local features path. By learning features and performing a majority of computation at local resolution, the cost and speed of operation of the trained neural network can be improved. To elaborate further, the flow diagram 600 depicts how a bilateral grid can be generated from the downsampled low resolution input 604 and used to transform to a high resolution output using the grid for faster operation of the trained neural network. The downsampled low resolution input 604 can be used to determine a grid of local affine models in bilateral space which approximate an image operator (e.g., HDR technique image operator) that can be learned by the trained neural network. The trained neural network can be trained to predict the coefficients of a locally affine model in the bilateral space.

In this way, the trained neural network can learn to make local, global, and context-dependent changes that approximate the image operator via a corresponding image transformation from input frame to output frame. As an example, the trained neural network may apply an operator via a local affine color transformation applied to the downsampled low resolution input 604 to obtain a low resolution output 606. The grid of local affine models in bilateral space can also include affine models based on a global path. That is, the bilateral grid of affine coefficients can be generated based on fusing local features (e.g., in a local path) and global features. Inferencing by the trained neural network is performed on the low resolution input 604 and/or low resolution output 606 to learn both local image features and global image features (e.g., histograms, average intensity, scene category, etc.). Fusing the local path and global path can be based on slicing such as a slicing node. The slicing node can be configured to determine final coefficients representing affine transforms.

The slicing node may perform data-dependent lookups in the low resolution grid of affine coefficients based on a learned guidance map to determine the low resolution output 506 that is transformed to the high resolution output 608 via the bilateral grid. In particular, fit bilateral space affine models can be used by the slicing node to obtain a new feature map from tri-linear interpolation. Thus, the slicing node can use the learned full resolution guidance map to predict the output pixel of the high resolution output 608. This, a complex operation on the full resolution image can be predicted using a plurality of simpler local models. The affine coefficients of the new feature map (e.g., upsampled via bilateral grid of affine coefficients) can be used to assemble the high resolution input 608 from the high resolution input 602. In this way, the trained neural network can output high resolution 608 that is an output frame enhanced and/or filtered by desired learned image operator(s) from the input frame quicker and at lower cost. Performing more of the machine learning processing at lower resolution may improve the speed and lower the processing cost of the trained neural network.

Figure 7:
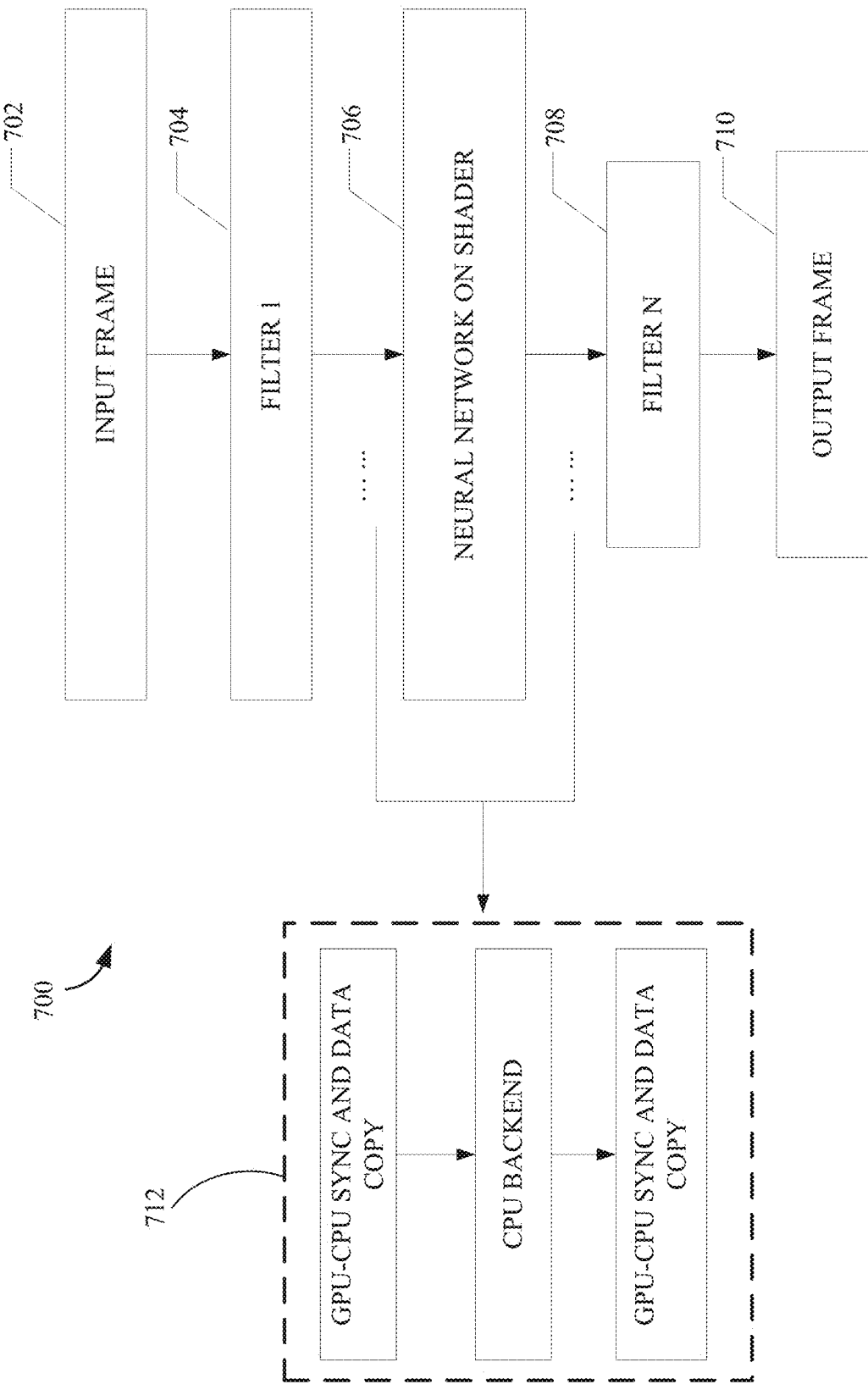
FIG. 7 is an example flow diagram illustrating an integrated pipeline implemented on a graphics processing unit, according to certain aspects of the present disclosure.

FIG. 7 is an example flow diagram illustrating an integrated pipeline 700 implemented on a graphics processing unit, according to certain aspects of the present disclosure.

The integrated pipeline 700 can be a homogenous pipeline that advantageously reduces output delay from approximately 10 second per processed frame to approximately 100 millisecond per frame or even 33 milliseconds per frame. The integrated pipeline 700 can operate faster based on removing a CPU pipeline or CPU portion of the integrated pipeline 700 so that CPU-GPU copying and moving of data can be removed or reduced. The integrated pipeline 700 can converge a computer graphics rendering pipeline with machine learning. As an example, the integrated pipeline 700 can include assembler, tesselator, rasterizer, shader and/or other computer graphics stages and/or components. The integrated pipeline 700 may converge these graphics rendering components with machine learning image filters/enhancements by implemented a small neural network onto the shader component, for example.

In this way, the integrated pipeline 700 performs both graphics rendering and image filtering in a faster, more efficient, and improved manner. The integrated pipeline 706 can advantageously implement a neural network (e.g., trained CNN as described herein) on a shader component 706 without the cost of GPU-CPU synchronization or copying of data. For example, image filtering (e.g., AI or non AI) on the GPU could be executed based on processing data (e.g., pre-processing or post-processing) on a PyTorch mobile CPU, which may result in delays, such as from synchronization. The neural network on the shader component 706 can run without the need for a remote or backend CPU, which may improve operation. Moreover, the integrated pipeline 700 beneficially may implement non machine learning image operators in addition to the machine learning image operations performed by the neural network on the shader component 706. For example, the integrated pipeline 700 can execute various legacy non-machine learning image filters 704, 706 without having to copy an input image in an early stage of filtering. As such, captured image frame or pictures can start (e.g., in a GPU memory component) and end being processed entirely on the integrated pipeline 700 of the GPU.

The image filters 704, 706 can be applied before or after deep learning based techniques. For example, prior to machine learning image filtering/enhancement, a user can apply pre-processing filtering such as manual filter settings such as color, fade, highlights, saturation, shadows and/or the like at filter 704. For example, after machine learning image filtering/enhancement, the user can apply post-processing filtering such as manual retouching such as color retouching, rotation, local brightness and darkness adjustments, manual application of image filters and/or the like at filter 706. All such pre-processing and post-processing advantageously can be performed on filters implemented on the GPU integrated pipeline 700. Accordingly, the integrated pipeline 700 reduces processing cost and output delay based on enabling all additional filtering 704, 706 to be performed before and after processing by the neural network on the shader component 706 to be implemented on the GPU without any CPU pipeline.

Figure 8:
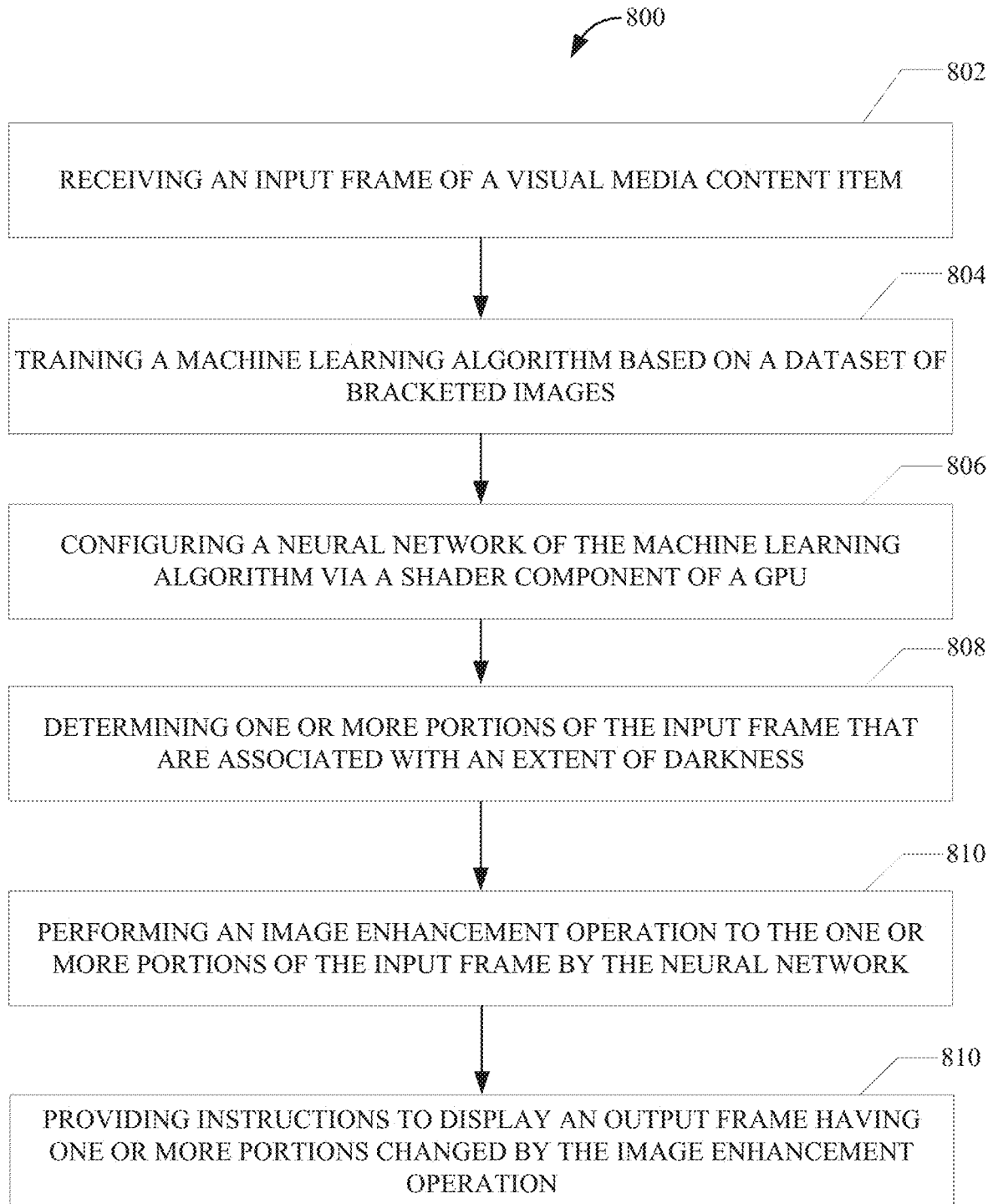
FIG. 8 is an example flow diagram for outputting filtered visual media content items via a computing platform, according to certain aspects of the present disclosure.

FIG. 8 illustrates an example flow diagram (e.g., process 800) for sending content via a computing platform, according to certain aspects of the disclosure. For explanatory purposes, the example process 800 is described herein with reference to one or more of the figures above. Further for explanatory purposes, the blocks of the example process 800 are described herein as occurring in serial, or linearly. However, multiple instances of the example process 800 may occur in parallel, overlapping in time, almost simultaneously, or in a different order from the order illustrated in method 800. In addition, the blocks of the example process 800 need not be performed in the order shown and/or one or more of the blocks of the example process 800 need not be performed. For purposes of explanation of the subject technology, the process 800 will be discussed in reference to one or more figures above. As an example, the process 800 may be performed at least partially by or via the exemplary network architecture 100 in FIG. 1, the example computing network 200 in FIG. 2, the example computer system 300 in FIG. 3, or the example computer system 900 in FIG. 9 described below. Accordingly, at least some of the steps in process 800 may be performed by a processor executing commands stored in the example computing platform(s) 302, for example. The example process 800 may be for outputting filtered visual media content items.

At step 802, an input frame of a visual media content item may be received. According to an aspect, receiving the input frame comprises receiving a photograph or video taken by a mobile computing device or imaging device. At step 804, a machine learning algorithm may be trained based on a dataset of bracketed images. According to an aspect, training the machine learning algorithm comprises using a generative adversarial network to train the neural network for generating output images that are modified by the image enhancement operation based on discriminating between enhanced and non-enhanced portions of unpaired images of the dataset of bracketed images. The neural network may comprise a convolutional neural network. According to an aspect, training the machine learning algorithm comprises determining an unpaired dataset of bracketed visual media content items. The bracket visual media content items may comprise a plurality of photos of one image at various camera settings At step 806, a neural network of the machine learning algorithm can be configured via a shader component of a graphics processing unit. For example, the configuration can be based on image filtering of the input frame. According to an aspect, configuring the neural network comprises initializing a plurality of strided convolutional layers, a slicing layer, and a plurality of fully connected layers. The image filtering may comprise pre-processing. At step 808, one or more portions of the input frame that are associated with an extent of darkness may be determined. According to an aspect, determining the one or more portions of the input frame comprises extracting, via the neural network, semantic information for determining locations for tonal adjustment and color correction in the input frames.

At step 810, an image enhancement operation to the one or more portions of the input frame may be performed by the neural network. According to an aspect, performing the image enhancement operation comprises downsampling the input frame to a low resolution input frame; applying, by the neural network, a learned bilateral upscaling operation within a bilateral grid; generating, via the low resolution input frame and the bilateral grid, local affine color transformations; upscaling the input frame to a high resolution frame; applying the local affine color transformations to the high resolution frame after upscaling the local affine color transformations; and outputting an image operator to apply the image enhancement operation to the high resolution frame. According to an aspect, performing the image enhancement operation comprises performing a global brightening operation to maintain brightness contrast between dark areas and light areas of the output frame.

At step 812, instructions to display an output frame having one or more portions changed by the image enhancement operation may be provided. According to an aspect, an integrated pipeline configured for implementation on the graphic processing unit comprises the neural network and an image filter configured to perform the image filtering of the input frame. According to an aspect, the process 800 may further include generating, via a camera, a plurality of successive images at a plurality of exposure levels. According to an aspect, the process 800 may further include determining a dataset of bracketed images based on the plurality of successive images. According to an aspect, the process 800 may further include determining, by the neutral network, a bilateral grid of affine coefficients. For example, the image enhancement operation may comprise at least one of: a face brightening operation, a color correction operation, an exposure operation, a tone mapping operation, a style transfer operation, a detail enhancement operation, or a manual annotation operation.

Figure 9:
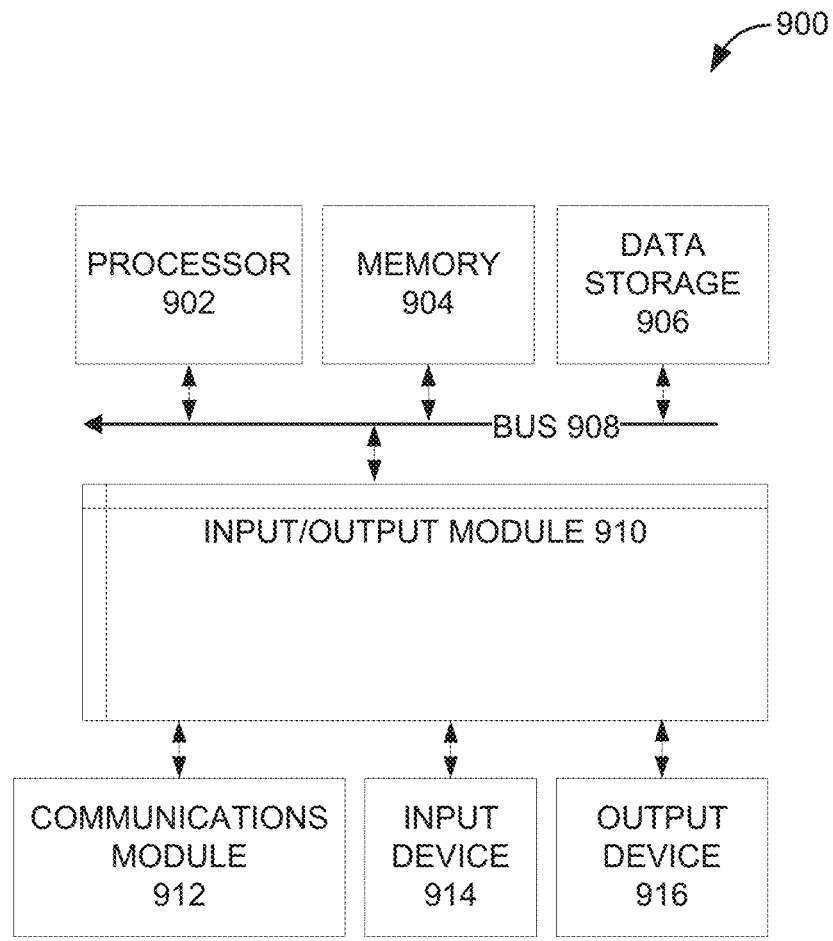
FIG. 9 is a block diagram illustrating an example computer system in which aspects of the present disclosure can be implemented.

FIG. 9 is a block diagram illustrating an exemplary computer system 900 with which aspects of the present disclosure can be implemented. In certain aspects, the computer system 900 may be implemented using hardware or a combination of software and hardware, either in a dedicated server, integrated into another entity, or distributed across multiple entities.

The computer system 900 includes a bus 608 or other communication mechanism for communicating information, and a processor 902 (e.g., a CPU, GPU, etc.) coupled with bus 608 for processing information. By way of example, the computer system 900 may be implemented with one or more processors 902. The processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 900 can include, in addition to hardware, code that creates an execution environment for the computer program in question, for example, code that constitutes processor firmware, a protocol stack, a database management system, an operating system, or a combination of one or more of them stored in an included memory 604 (e.g., memory 220a-220b), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to the bus 608 for storing information and instructions to be executed by processor 902. The processor 902 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as a LCD (liquid crystal display) monitor, for displaying information to the user.

According to one aspect of the present disclosure, the computing platform 100 and the architecture 300 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 900 can include clients and servers. A client and server are generally remote from each other and typically interact through a communication network. The relationship of client and server arises by virtue of computer programs running on the respective computers and having a client-server relationship to each other. The computer system 900 can be, for example, and without limitation, a desktop computer, laptop computer, or tablet computer. The computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to the processor 902 for execution. Such a medium may take many forms, including, but not limited to, non-volatile media, volatile media, and transmission media. Non-volatile media include, for example, optical or magnetic disks, such as the data storage device 906. Volatile media include dynamic memory, such as the memory 904. Transmission media include coaxial cables, copper wire, and fiber optics, including the wires that comprise the bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for outputting filtered visual media content items, the method comprising:
   receiving an input frame of a visual media content item;
   training a machine learning algorithm based on a dataset of bracketed images; configuring, via a shader component of a graphics processing unit, a neural network of the machine learning algorithm based on image filtering of the input frame;
   determining one or more portions of the input frame that are associated with an extent of darkness, wherein determining the one or more portions of the input frame comprises extracting, via the neural network, semantic information for determining locations for tonal adjustment and color correction in the input frame;
   performing, by the neural network, an image enhancement operation to the one or more portions of the input frame; and
   providing instructions to display an output frame having one or more portions changed by the image enhancement operation.

2. The computer-implemented method of claim 1, wherein receiving the input frame comprises receiving a photograph or video taken by a mobile computing device or imaging device.

3. The computer-implemented method of claim 1, wherein training the machine learning algorithm comprises using a generative adversarial network to train the neural network for generating output images that are modified by the image enhancement operation based on discriminating between enhanced and non-enhanced portions of unpaired images of the dataset of bracketed images, wherein the neural network comprises a convolution neural network.

4. The computer-implemented method of claim 1, wherein training the machine learning algorithm comprises determining an unpaired dataset of bracketed visual media content items, wherein the bracket visual media content items comprise a plurality of photos of one image at various camera settings.

5. The computer-implemented method of claim 1, wherein configuring the neural network comprises initializing a plurality of strided convolutional layers, a slicing layer, and a plurality of fully connected layers, wherein the image filtering comprises image pre-processing.

6. The computer-implemented method of claim 1, wherein performing the image enhancement operation comprises:
   down sampling the input frame to a low resolution input frame;
   applying, by the neural network, a learned bilateral upscaling operation within a bilateral grid;
   generating, via the low resolution input frame and the bilateral grid, local affine color transformations;
   upscaling the input frame to a high resolution frame;
   applying the local affine color transformations to the high resolution frame after upscaling the local affine color transformations; and
   outputting an image operator to apply the image enhancement operation to the high resolution frame.

7. The computer-implemented method of claim 1, wherein performing the image enhancement operation comprises performing a global brightening operation to maintain brightness contrast between dark areas and light areas of the output frame.

8. The computer-implemented method of claim 1, wherein an integrated pipeline configured for implementation on the graphic processing unit comprises the neural network and an image filter configured to perform the image filtering of the input frame.

9. The computer-implemented method of claim 1, further comprising:
   generating, via a camera, a plurality of successive images at a plurality of exposure levels;
   determining a dataset of bracketed images based on the plurality of successive images; determining, by the neural network, a bilateral grid of affine coefficients, wherein the image enhancement operation comprises at least one of: a face brightening operation, a color correction operation, an exposure operation, a tone mapping operation, a style transfer operation, a detail enhancement operation, or a manual annotation operation.

10. A system for outputting filtered visual media content items, comprising:
    one or more processors; and
    a memory comprising instructions stored thereon, which when executed by the one or more processors, causes the one or more processors to perform:
    generating, via a camera, a plurality of successive images at a plurality of exposure levels;
    determining a dataset of bracketed images based on the plurality of successive images;
    receiving an input frame of a visual media content item;
    training a neural network of a machine learning algorithm based on the dataset of bracketed images;
    configuring, via a shader component of a graphics processing unit, a neural network of the machine learning algorithm based on image filtering of the input frame;
    determining one or more portions of the input frame that are associated with an extent of darkness, wherein determining the one or more portions of the input frame comprises extracting, via the neural network, semantic information for determining locations for tonal adjustment and color correction in the input frame;
    performing, by the neural network, an image enhancement operation to the one or more portions of the input frame; and
    providing instructions to display an output frame having one or more portions changed by the image enhancement operation.

11. The system of claim 10, wherein the instructions that cause the one or more processors to perform receiving the input frame cause the one or more processors to perform receiving a photograph or video taken by a mobile computing device or imaging device.

12. The system of claim 10, wherein the instructions that cause the one or more processors to perform training the machine learning algorithm cause the one or more processors to perform using a generative adversarial network to train the neural network for generating output images that are modified by the image enhancement operation based on discriminating between enhanced and non-enhanced portions of unpaired images of the dataset of bracketed images, wherein the neural network comprises a convolution neural network.

13. The system of claim 10, wherein the instructions that cause the one or more processors to perform training the machine learning algorithm cause the one or more processors to perform determining an unpaired dataset of bracketed visual media content items, wherein the bracket visual media content items comprise a plurality of photos of one image at various camera settings.

14. The system of claim 10, wherein the instructions that cause the one or more processors to perform configuring the neural network cause the one or more processors to perform initializing a plurality of strided convolutional layers, a slicing layer, and a plurality of fully connected layers, wherein the image filtering comprises image preprocessing.

15. The system of claim 10, wherein the instructions that cause the one or more processors to perform the image enhancement operation cause the one or more processors to perform:
- downsampling the input frame to a low resolution input frame;
- applying, by the neural network, a learned bilateral upscaling operation within a bilateral grid;
- generating, via the low resolution input frame and the bilateral grid, local affine color transformations;
- upscaling the input frame to a high resolution frame;
- applying the local affine color transformations to the high resolution frame after upscaling the local affine color transformations; and
- outputting an image operator to apply the image enhancement operation to the high resolution frame.

16. The system of claim 10, wherein the instructions that cause the one or more processors to perform the image enhancement operation cause the one or more processors to perform a global brightening operation to maintain brightness contrast between dark areas and light areas of the output frame.

17. The system of claim 10, further comprising stored sequences of instructions, which when executed by the one or more processors, cause the one or more processors to perform: generating, via a camera, a plurality of successive images at a plurality of exposure levels; determining a dataset of bracketed images based on the plurality of successive images; and determining, by the neural network, a bilateral grid of affine coefficients, wherein the image enhancement operation comprises at least one of: a face brightening operation, a color correction operation, an exposure operation, a tone mapping operation, a style transfer operation, a detail enhancement operation, or a manual annotation operation.

18. A non-transitory computer-readable storage medium comprising instructions stored thereon, which when executed by one or more processors, cause the one or more processors to perform operations for outputting filtered visual media content items, comprising: generating, via a camera, a plurality of successive images at a plurality of exposure levels;
- determining a dataset of bracketed images based on the plurality of successive images;
- receiving an input frame of a visual media content item;
- training a neural network of a machine learning algorithm based on the dataset of bracketed images;
- configuring, via a shader component of a graphics processing unit, a neural network of the machine learning algorithm based on image filtering of the input frame;
- determining one or more portions of the input frame that are associated with an extent of darkness wherein determining the one or more portions of the input frame comprises extracting, via the neural network, semantic information for determining locations for tonal adjustment and color correction in the input frame;
- determining, by the neural network, a bilateral grid of affine coefficients;
- performing, by the neural network and based on the bilateral grid of affine coefficients, an image enhancement operation to the one or more portions of the high resolution version of the input frame; and
- providing instructions to display an output frame having one or more portions changed by the image enhancement operation.

* * * * *